(12) United States Patent
Tambornino

(10) Patent No.: US 6,709,002 B2
(45) Date of Patent: Mar. 23, 2004

(54) BALL HITCH

(76) Inventor: Curt Tambornino, 1451 E. Park Creek Rd., Fall Creek, WI (US) 54742

( * ) Notice: Subject to any disclaimer, the term of this patent is extended or adjusted under 35 U.S.C. 154(b) by 0 days.

(21) Appl. No.: 10/192,392

(22) Filed: Jul. 10, 2002

(65) Prior Publication Data

US 2004/0007852 A1 Jan. 15, 2004

(51) Int. Cl.$^7$ ................................................. B60D 1/06
(52) U.S. Cl. ...................................................... 280/511
(58) Field of Search ............................... 280/491.2, 511

(56) References Cited

U.S. PATENT DOCUMENTS

| | | | | |
|---|---|---|---|---|
| 5,503,422 A | * | 4/1996 | Austin | 280/477 |
| 5,549,316 A | * | 8/1996 | Jones | 280/477 |
| 5,735,539 A | * | 4/1998 | Kravitz | 280/506 |
| 5,884,931 A | * | 3/1999 | McCoy | 280/511 |
| 6,203,048 B1 | * | 3/2001 | Adair | 280/491.5 |
| 6,234,510 B1 | * | 5/2001 | Hammons | 280/477 |
| 6,536,794 B2 | * | 3/2003 | Hancock et al. | 280/511 |
| 2002/0140205 A1 | * | 10/2002 | Adams | 280/455.1 |

* cited by examiner

*Primary Examiner*—Lesley D. Morris
*Assistant Examiner*—Matthew Luby
(74) *Attorney, Agent, or Firm*—Shewchuk IP Services; Jeffrey D. Shewchuk

(57) ABSTRACT

A ball hitch has a hitch tube which fits within a hitch receiver of a towing vehicle. The trailing end of the hitch tube is perpendicular cut. A hitch tongue has a contact face adjoined to the hitch tube and an exposed face opposite the contact face. A hitch tube receiving recess is defined in the contact face, with the hitch tube receiving recess receiving the perpendicular cut trailing end of the hitch tube therein. The exposed face of the hitch tongue is preferably disposed at an angle relative to the abutment surface of the hitch tube receiving recess which contacts the cut at the trailing end of the hitch tube.

20 Claims, 2 Drawing Sheets

BALL HITCH

CROSS-REFERENCE TO RELATED APPLICATION(S)

None.

BACKGROUND OF THE INVENTION

The present invention relates to ball hitches, and more particularly, to ball hitches having a hitch tongue attached to a hitch tube or bar, which is in turn received in a hitch receiver on the towing vehicle.

Ball hitches are used in a wide variety of towing applications for towing many different kinds of trailers. Ball hitches may be mounted to vehicle bumpers and/or hitch drawbars, and in some applications mounted in the bed of a pickup truck. A common method of attaching the ball hitch to the vehicle is using a female hitch receiver mounted on the vehicle. The female hitch receiver defines a sleeve, typically of a generally square cross-sectional shape, which receives the leading end of a hitch tube of corresponding shape and size, such that the leading end of the hitch tube may be slid into the receiver. The hitch tube is removably attached to the hitch receiver such as by a locking pin which passes through corresponding holes in the hitch receiver and the hitch tube. The ball is then supported by the trailing end of the hitch tube, such as on a hitch tongue.

Such ball hitches need to be strong and reliable, while maintaining a relatively low cost. Improvements which increase the strength and/or reliability of the ball hitch, while simultaneously reducing costs such as in manufacturing and assembly, are very beneficial.

BRIEF SUMMARY OF THE INVENTION

The present invention is a hitch for use with a hitch receiver of a towing vehicle. The hitch includes two primary parts, a hitch tube and a hitch tongue. In one aspect of the invention, at least the trailing end, and preferably the leading end as well, of the hitch tube terminate in cuts perpendicular to the longitudinal axis of the hitch tube. The hitch tongue has a contact face abutting the hitch tube and an exposed face opposite the contact face. A hitch tube receiving recess is defined in the contact face, with the hitch tube receiving recess receiving the trailing end of the hitch tube therein. In another aspect of the invention, the exposed face of the hitch tongue is disposed at an angle relative to the abutment surface of the hitch tube receiving recess which contacts the cut at the trailing end of the hitch tube.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
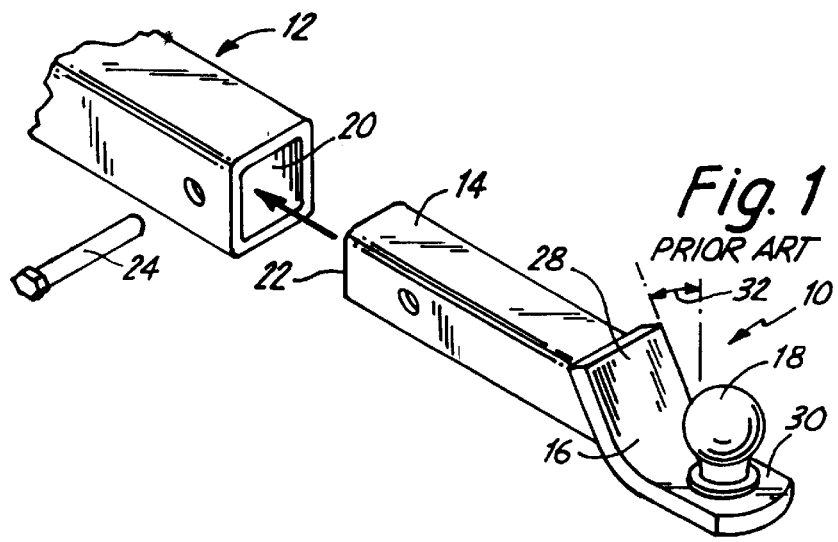
FIG. 1 is a perspective view showing a prior art ball hitch being attached into a hitch receiver on a vehicle.

As shown in FIG. 1, a ball hitch 10 of the prior art is commonly used with a hitch receiver 12 mounted on a vehicle (not shown) as well known in the art. The ball hitch 10 includes a hitch tube 14 with a hitch tongue 16 supporting a ball 18. The hitch receiver 12 provides a female receiving opening 20 for receiving the hitch tube 14 of the ball hitch 10. For instance, a common shape and size for the hitch receiver 12 provides a two inch by two inch square opening 20.

The hitch tube 14 is of the same size and outer shape as the hitch receiver opening 20, such that a leading end 22 of the hitch tube 14 can be received in the hitch receiver 12 in a coaxial sleeve arrangement. Such prior art hitch tubes 14 are commonly formed out of steel tubular stock. Once the hitch tube 14 is inserted and positioned at its proper axial position within the hitch receiver 12, a locking pin 24 can then be used to removably secure the hitch tube 14 and hitch receiver 12.

The hitch tongue 16 is attached to a trailing end 26 of the hitch tube 14. A common method of attaching the hitch tongue 16 to the hitch tube 14 is through welding. The hitch tongue 16 provides an opening 27 for attachment of the hitch ball 18. Hitch tongues 16 in the prior art commonly have two sides, a leading side 28 and a ball receiving trailing side 30. The hitch tongue 16 is typically commonly formed out of a bent piece of bar steel.

The leading side 28 of the hitch tongue 16, which is attached to the trailing end 26 of the hitch tube 14, is commonly disposed at a non-perpendicular angle 32 relative to the ball receiving side 30 of the hitch tongue 16. In particular, it is common to angle the leading side 28 of the hitch tongue 16 at about 26° from vertical, with the ball receiving side 30 of the hitch tongue 16 defining horizontal. This angle 32 provides an aesthetically pleasing surface profile to the hitch 10, but also provides structural benefits. In particular, the angle 32 gives ample access on the top of the tongue 16 so that upper portions of the hitch tube 14/hitch tongue 16 do not interfere with subsequent attachment of a trailer tongue (not shown) to the hitch 10. For instance, the angle 32 of the hitch tongue 16 permits a user's knuckles to not be squeezed between the ball receiving tongue of the trailer (not shown) and hitch 10 during attachment of the ball-receiving tongue of the trailer over the ball 18.

Further, the angled attachment of the hitch tongue 16 to the hitch tube 14 helps the hitch 10 to better bear the loads to which it is commonly subjected, particularly through the weld between the hitch tongue 16 and the hitch tube 14. During towing, the drag force of the load is transferred between the hitch tongue 16 and the hitch tube 14 at an angle relative to the weld plane, and is thus bourne by the weld part in sheer and part in tension. The entirety of the drag force of the load does not commonly act in a single direction on the attachment to possibly separate the welded attachment, or cause bending of either the hitch tongue 16 or the hitch tube 14. The downward weight of the load tends to push the angle portion 28 of the hitch tongue 16 into the hitch tube 14, so as to be bourne by the weld attachment part in compression and part in bending sheer, rather than all in sheer or part or all in tension.

Figure 2:
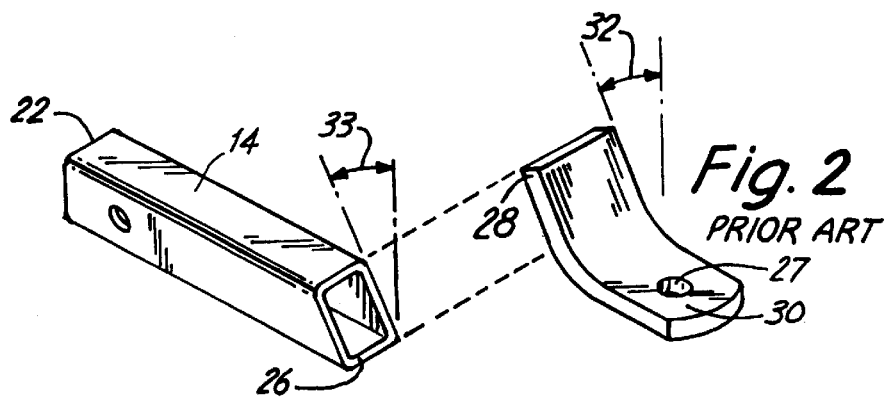
FIG. 2 is a perspective view showing the manufacturing assembly of the prior art hitch of FIG. 1.
Figure 3:
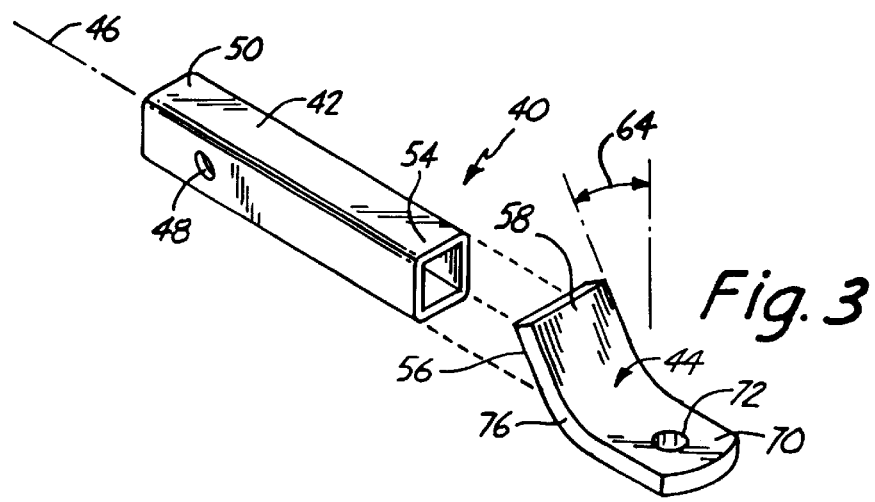
FIG. 3 is a perspective view showing the manufacturing assembly of the preferred hitch of the present invention.

FIG. 2 shows the relatively simple, straight forward manufacturing method of the prior art ball hitch 10. The hitch tube 14 is cut from commonly available stock steel. The trailing end 26 of the hitch tube 14 is bevel or miter cut to length at the desired angle 33, for instance, the angle of 26°. The hitch tongue 16 is bent from bar steel. The leading side 28 of the hitch tongue 16 is then welded to the bevel cut trailing end 26 of the hitch tube 14.

While this method of assembly is simple and straight forward, it does not lend itself to mass production. In particular, the miter cut of the trailing end 26 for each hitch tube 14 must be separately measured and cut. Multiple hitch tubes 14 cannot be cut in a batch process, i.e., cannot be easily arranged into an array or bundle of hitch tubes 14 and simultaneously cut in a single cutting action, because such bevel cuts would produce different lengths to each piece.

Additionally, the (typically welded) contact between the hitch tongue 16 and the trailing end 26 of the hitch tube 14 occurs in a single plane, such as in the 26° plane of the miter angle 33. When only extending in a single plane, the welded attachment is not as strong and robust as it could be.

FIGS. 3–6 show a preferred hitch 40 in accordance with the present invention. The hitch 40 includes a hitch tube 42 and a hitch tongue 44. The hitch tube 42 can have whatever cross-sectional shape is desired to transfer the load from the hitch ball 18 to the hitch receiver 12. The preferred hitch tube 42 has a generally square cross-sectional shape (similar to the cross-sectional shape of the prior art), to match the size and shape of standard hitch receivers 12. One standard size of hitch receiver 12 is two inches by two inches square, but workers skilled in the art will understand that other sizes and shapes could equivalently be used. Two inch by two inch (outer dimensions) square tubing is commonly commercially available, such as in twenty foot lengths. The term "hitch tube" as used in the present application is not limited to hollow structures, but could alternatively be provided as a solid bar. However, by being hollow the hitch tube 42 provides sufficient strength at a reduced weight and cost. The preferred hitch tube 42 extends linearly about a longitudinal axis 46 for a short distance such as about 8 inches, but other lengths could be used and bends could be provided in the hitch tube 42.

Holes 48 are preferably provided on the leading end 50 of the hitch tube 42 to facilitate securing the hitch tube 42 within the hitch receiver 12 at its desired axial position. For instance, a bolt or a pin 24 may be used through corresponding holes 52 in the hitch receiver 12 as well as through the holes 48 in the hitch tube 42.

The leading end 50 and the trailing end 54 of the hitch tube 42 preferably terminate in cuts perpendicular to the longitudinal axis 46. While some benefits of the invention could be achieved by cutting either or both the leading end 50 and the trailing end 54 at an angle, perpendicular cutting of the leading end 50 and the trailing end 54 results in significant savings. By having ends 50, 54 cut at perpendicular angles, multiple hitch tubes 42 can be matched in an array and simultaneously cut in a single pass of a cutting blade (not shown). Accordingly, mass production of multiple hitch tubes 42 of a desired length is accomplished in a very simple cutting procedure.

The hitch tongue 44 of the present invention has a contact face 56 abutting the hitch tube 42 and an exposed face 58 opposite the contact face 56. In contrast to the prior art, the hitch tongue 44 of the present invention is not simply a bent piece of bar steel, but rather is formed to have a specific contact face profile. If desired, the contact face 56 could have a through-hole which receives the hitch tube 42 therethrough. The preferred contact face 56 provides a recess 60 (best shown in FIG. 4). The preferred recess 60 matches the outer dimensions of the hitch tube 42 in shape and size. The recess 60 defines a receiving contact or abutment surface 62 which is perpendicular to the axis 46 of the hitch tube 42. The exposed face 58 of the hitch tongue 44 is preferably continuous and flat over the hitch tube receiving recess 60. If desired in some circumstances however, part of the recess 60 may extend fully through to the exposed face 58 of the hitch tongue 44, creating a through hole which is smaller in size than the hitch tube 42 but allows a top corner of the hitch tube 42 to extend therethrough. If part or all of the cross-sectional shape of the hitch tube 42 extends through the exposed face 58 of the hitch tongue 44, the exposed end of the hitch tube 42 may be closed off such as with a plastic cap (not shown). As another alternative, a central portion of the exposed face 58 may extend inside the hitch tube 42.

The hitch tongue 44 can be cast in this configuration or can be forged or stamped to have the receiving recess 60. Alternatively, the hitch tongue 44 can be machined from a metal plate having sufficient thickness that at least a part of the hitch tube receiving recess 60 does not extend fully through the hitch tongue 44. In the preferred embodiment, the hitch tongue 44 is forged from about ¾ inch thick 1040 hot rolled steel.

The hitch tube receiving recess 60 receives the trailing end 54 of the hitch tube 42, with the abutment surface 62 contacting the cut at the trailing end 54 of the hitch tube 42. As can be seen, the exposed face 58 is preferably disposed at an angle 64 relative to the abutment surface 62 of the hitch tube receiving recess 60. The abutment surface 62 of the hitch tube receiving recess 60 is disposed at a non-perpendicular angle 64 (1° to 89°) such as from 10° to 50° relative to the exposed face 58, more preferably at an angle 64 of from 20° to 40°, and most preferably at an angle 64 of about 26°. With this angle 64, the exposed face 58 is not perpendicular to the longitudinal axis 46 of the hitch tube 42. This angle 64 provides an aesthetically pleasing surface profile to the hitch 40. The angle 64 gives ample access on the top of the ball 18 so that the upper end of the hitch tube 42/hitch tongue 44 does not interfere with subsequent attachment of a trailer tongue over the ball 18. For instance, the angle of the hitch tongue 44 permits a user's knuckles to not be squeezed between the ball receiving tongue of the trailer (not shown) and hitch 40 during attachment of the ball-receiving tongue of the trailer over the ball 18.

Figure 4:
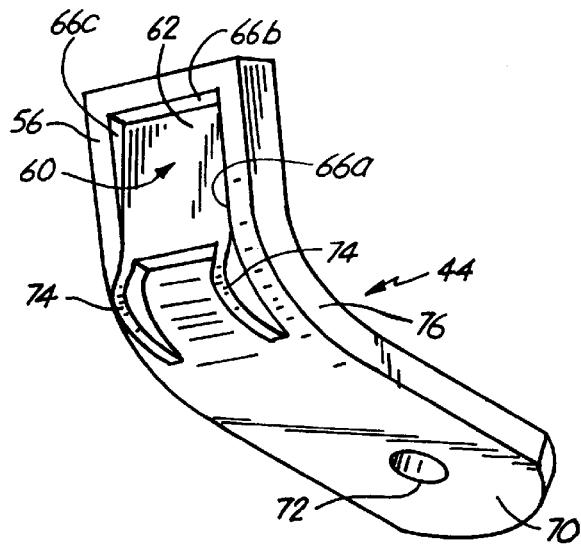
FIG. 4 is a perspective view from the leading side showing the preferred hitch tongue of the preferred embodiment of the present invention.
Figure 5:
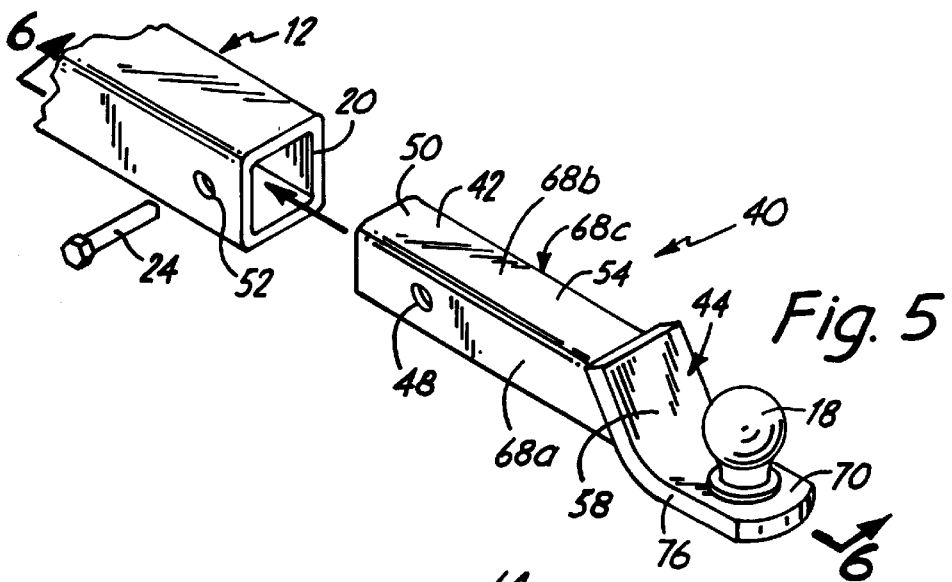
FIG. 5 is a perspective view showing the preferred hitch of the present invention being attached into a hitch receiver of the vehicle.
Figure 6:
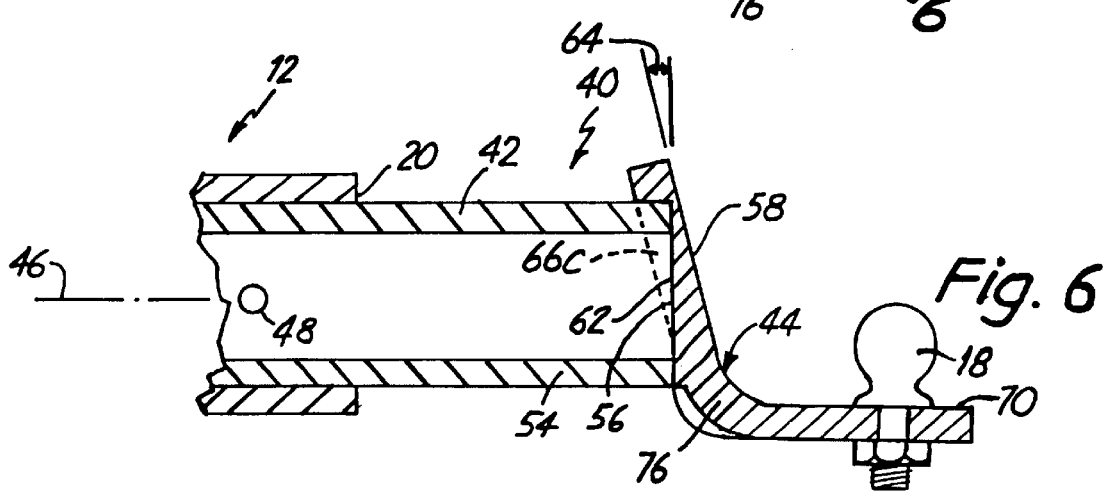
FIG. 6 is a longitudinal cross-sectional view showing the preferred hitch of the present invention, taken along line 6—6 in FIG. 5.

As best shown in FIG. 4, the hitch tube receiving recess 60 preferably includes at least one and more preferably includes three side faces 66a, 66b, 66c. These side faces 66a, 66b, 66c preferably extend parallel to the longitudinal axis 46 of the hitch tube 42. In the preferred embodiment, the top side face 66b, by virtue of the fact that it extends parallel to the longitudinal axis 46 of the hitch tube 42, extends at a non-perpendicular angle relative to the exposed face 58 of the hitch tongue 44. With the three side faces 66a, 66b, 66c, the preferred hitch tube receiving recess 60 is sized to mate with the hitch tube 42 on at least three sides 68a, 68b, 68c of the generally square cross-sectional shape of the hitch tube 42. If desired, and particularly for embodiments wherein a portion of the hitch tube receiving recess 60 extends fully through the exposed face 58 of the hitch tongue 44, the hitch tube receiving recess 60 may have four side faces 66 which contact and mate with four sides of the generally square cross-sectional shape of the hitch tube 42.

The hitch tongue 44 is fixedly attached to the hitch tube 42. While such an attachment could be through bolts, etc., the preferred method of attachment is by welding the hitch tongue 44 to the hitch tube 42. The hitch tube receiving recess 60 facilitates the welding process because the hitch tube receiving recess 60 holds the hitch tongue 44 at the proper position relative to the hitch tube 42 prior to and during the welding process. Further, the three side faces 66a, 66b, 66c of the hitch tube receiving recess 60 serve to significantly strengthen the weld attachment between the hitch tube 42 and the hitch tongue 44. The hitch tube 42 is welded to the hitch tongue 44 not only on the cut end face 54 of the hitch tongue 44 to the abutment surface 62, but also on three side faces 68a, 68b, 68c of the hitch tube 42 to the three side faces 66a, 66b, 66c of the hitch tube receiving recess 60. The welded attachment thus runs in four planes in each of three perpendicular directions, i.e., in a horizontal plane, in two vertical front-to-back planes, and in a vertical side-to-side plane. This welded attachment is very robust and strong, and transfers loads from the hitch tongue 44 to the hitch tube 42 in a very efficient manner so as to avoid bending or fatigue breakage. If even more strength is desired, the hitch tube receiving recess 60 could be formed with four side faces 66 to securely receive the hitch tube 42 including welded contact on each of the four side faces 68 of the hitch tube 42, particularly in embodiments wherein the hitch tube 42 extends partly or fully through the hitch tongue 44.

The trailing side 70 of the hitch tongue 44 preferably extends generally parallel to the longitudinal axis 46 of the hitch tube 42. A circular hole 72 may be formed in the hitch tongue 44 for ready attachment of the desired hitch ball 18, such as with a hitch ball post of a hitch ball 18 extending through the circular hole 72. Alternatively, any method of attachment of the hitch ball 18 to the hitch tongue 44 is acceptable.

With the hitch tongue 44 formed in a casting, stamping or forging process, stabilizer vanes or reinforcement ribs 74 can be formed which run longitudinally at the bend 76. In the preferred embodiment, two reinforcement ribs 74 are provided, but more, less or no reinforcement ribs could be used depending upon the desired strength characteristics. The reinforcement ribs 74 help to triangulate and strengthen the angle 64 of the bend 76, and can further provide a portion of the abutment edge 62 against the trailing end 54 of the hitch tube 42.

Although the present invention has been described with reference to preferred embodiments, workers skilled in the art will recognize that changes may be made in form and detail without departing from the spirit and scope of the invention.

What is claimed is:

1. A hitch for use with a hitch receiver of a towing vehicle comprising:
    a hitch tube sized to be received in the hitch receiver of the towing vehicle, the hitch tube extending about a longitudinal axis between a leading end and a trailing end; and
    a hitch tongue secured to the hitch tube, the hitch tongue having a contact face abutting the hitch tube and an exposed face opposite the contact face, the hitch tongue having a hitch tube receiving recess defined in the contact face, with the hitch tube receiving recess receiving the trailing end of the hitch tube therein, the hitch tube receiving recess having an abutment surface which contacts the cut at the trailing end of the hitch tube.

2. The hitch of claim 1, wherein the abutment surface of the hitch tube receiving recess is disposed at an angle relative to the exposed face, such that the exposed face is not perpendicular to the longitudinal axis of the hitch tube.

3. The hitch of claim 2, wherein the abutment surface of the hitch tube receiving recess is disposed at an angle of from 10° to 50° relative to the exposed face.

4. The hitch of claim 3, wherein the abutment surface of the hitch tube receiving recess is disposed at an angle of from 20° to 40° relative to the exposed face.

5. The hitch of claim 4, wherein the abutment surface of the hitch tube receiving recess is disposed at an angle of about 26° relative to the exposed face.

6. The hitch of claim 2, wherein at least one side face is defined in the hitch tube receiving recess which extends parallel to the longitudinal axis of the hitch tube and at a non-perpendicular angle relative to the exposed face of the hitch tongue.

7. The hitch of claim 1, wherein the exposed face of the hitch tongue is continuous and flat over the hitch tube receiving recess.

8. The hitch of claim 1, wherein the hitch tongue is forged from metal with the hitch tube receiving recess formed by the forge.

9. The hitch of claim 1, wherein the hitch tongue is welded to the hitch tube.

10. The hitch of claim 1, wherein the hitch tongue includes a hitch portion extending generally parallel to the longitudinal axis of the hitch tube, with a bend between the exposed face and the hitch portion, and further comprising at least one support rib running longitudinally at the bend.

11. The hitch of claim 10, wherein the hitch tongue includes a hitch ball hole for receiving a hitch ball post therethrough, and wherein the leading end of the hitch tube includes a hole therethrough for pin or bolt attachment within the hitch receiver.

12. The hitch of claim 1, wherein the hitch tube has a generally square cross-sectional shape, and wherein the hitch tube receiving recess is sized to mate with the hitch tube on at least three sides of the generally square cross-sectional shape.

13. The hitch of claim 1, wherein the hitch tongue is machined from a metal plate having sufficient thickness that the hitch tube receiving recess does not extend fully through the hitch tongue.

14. The hitch of claim 1, wherein the leading end and the trailing end terminating in cuts perpendicular to the longitudinal axis.

15. A method of forming a hitch for use with a hitch receiver of a towing vehicle, the method comprising:
    cutting a hitch tube perpendicular to its longitudinal axis, the hitch tube sized to be received in the hitch receiver of the towing vehicle;
    forming a hitch tube receiving recess in a contact face of a hitch tongue, the hitch tongue having an exposed face opposite the contact face, the hitch tube receiving recess having an abutment surface; and
    securing the hitch tongue to the hitch tube with the hitch tube receiving recess receiving the perpendicular cut end of the hitch tube therein and with the abutment surface contacting the perpendicular cut end of the hitch tube.

16. The method of claim 15, wherein the act of forming the hitch tube comprises casting the hitch tube with the hitch tube receiving recess defined therein.

17. The method of claim 15, wherein the act of forming the hitch tongue comprises bending the hitch tongue to form a hitch portion extending generally parallel to the longitudinal axis of the hitch tube, with the exposed face extending at an angle of at least 40° relative to the longitudinal axis of the hitch tube.

18. The method of claim 15, wherein the act of securing the hitch tongue to the hitch tube comprises welding the hitch tongue to the hitch tube.

19. The method of claim 15, wherein the act of forming a hitch tube receiving recess comprises defining at least one side face in the hitch tube receiving recess which extends parallel to the longitudinal axis of the hitch tube and at a non-perpendicular angle relative to the exposed face of the hitch tongue.

20. The method of claim 15 wherein the cutting act comprises simultaneously cutting a plurality of the hitch tubes to length, each hitch tube sized to be received in hitch receivers of towing vehicles, wherein the forming act comprises forming the hitch tube receiving recess in the contact face of each of a plurality of the hitch tongues, each hitch tongue having an exposed face opposite the contact face, and wherein the securing act comprises securing each hitch tongue to one of the cut-to-length hitch tubes with the hitch tube receiving recess receiving the cut end of the hitch tube.

* * * * *